(12) United States Patent
Dillon

(10) Patent No.: US 11,433,701 B1
(45) Date of Patent: Sep. 6, 2022

(54) WHEEL

(71) Applicant: CDP Diamond Products, Inc., Livonia, MI (US)

(72) Inventor: David M. Dillon, Plymouth, MI (US)

(73) Assignee: CDP DIAMOND PRODUCTS, INC., Livonia, MI (US)

( * ) Notice: Subject to any disclaimer, the term of this patent is extended or adjusted under 35 U.S.C. 154(b) by 0 days.

(21) Appl. No.: 17/465,104

(22) Filed: Sep. 2, 2021

Related U.S. Application Data

(60) Provisional application No. 63/230,488, filed on Aug. 6, 2021.

(51) Int. Cl.
*B60B 15/02* (2006.01)
*B60B 3/08* (2006.01)
*F16L 55/28* (2006.01)
*G05D 1/02* (2020.01)

(52) U.S. Cl.
CPC ............... *B60B 15/02* (2013.01); *B60B 3/08* (2013.01); *F16L 55/28* (2013.01); *B60B 2310/30* (2013.01); *B60B 2360/102* (2013.01); *B60B 2360/104* (2013.01); *G05D 1/021* (2013.01); *G05D 2201/0207* (2013.01)

(58) Field of Classification Search
CPC ............... B60B 15/02; B60B 2310/30; B60B 2360/102; B60B 2360/104; B60B 3/08; F16L 55/28
See application file for complete search history.

(56) References Cited

U.S. PATENT DOCUMENTS

| 1,323,868 | A | * | 12/1919 | Julien | B60B 15/025 |
| | | | | | 301/43 |
| 2006/0255653 | A1 | * | 11/2006 | Gibbins | E02F 9/2841 |
| | | | | | 301/43 |
| 2012/0299372 | A1 | * | 11/2012 | Kruger | B62D 55/28 |
| | | | | | 305/192 |
| 2014/0023358 | A1 | | 1/2014 | Dumig et al. | |
| 2015/0146216 | A1 | | 5/2015 | Krauhausen et al. | |
| 2017/0146462 | A1 | | 5/2017 | Baker et al. | |
| 2018/0017376 | A1 | | 1/2018 | Moore | |
| 2018/0208100 | A1 | * | 7/2018 | Weaver | F16L 55/28 |

FOREIGN PATENT DOCUMENTS

| AU | 777281 | B2 | * | 10/2004 | ........... | B08B 9/0557 |
| CN | 102506737 | A | | 6/2012 | | |
| CN | 205718863 | U | | 11/2016 | | |
| CN | 112827960 | A | * | 5/2021 | | |
| DE | 19505195 | A1 | * | 8/1996 | .............. | F16L 55/28 |

(Continued)

*Primary Examiner* — Kip T Kotter
(74) *Attorney, Agent, or Firm* — Carlson, Gaskey & Olds, P.C.

(57) ABSTRACT

A studded wheel increases traction of a vehicle along slippery surfaces, such as a pipe. The wheel features a wheel body manufactured from a rigid material and having a tread surface. A plurality of studs are secured to the tread surface of the wheel body. The plurality of studs may be polycrystalline diamond. The plurality of studs may be secured directly to the tread surface of the wheel body, such as by brazing. The vehicle to which the wheel is attached may be an inspection vehicle with a mounted camera system fitted for surveying inaccessible areas including sewer systems and other internal piped locations.

21 Claims, 2 Drawing Sheets

(56) References Cited

FOREIGN PATENT DOCUMENTS

| | | | |
|---|---|---|---|
| GB | 2329244 A | 3/1999 | |
| JP | 63058137 A | 3/1988 | |
| JP | 08178907 A | 7/1996 | |
| KR | 101664365 B1 | 10/2016 | |
| WO | WO-9219422 A1 * | 11/1992 | ............. B24B 53/12 |
| WO | 2019220100 A1 | 11/2019 | |

* cited by examiner

WHEEL

BACKGROUND

Pipe inspection robots or vehicles are used to remotely travel through pipes, such as sewers, to provide visual inspection via a camera on the pipe inspection vehicle. The pipe inspection vehicles include wheels having convex tread surfaces shaped to engage the inner surface of the pipe. The wheels are solid metal and may have an irregular tread coating on the tread surfaces. The tread surfaces may have carbide secured thereto to increase traction.

However, current wheel designs often result in vehicles becoming stuck in wet, slippery environments within the pipes due to a lack of traction with the ground surfaces and due to the weight of the cables being dragged by the pipe inspection vehicle.

As the vehicle travels further into the pipe, the length of cable being dragged by the vehicle increases. The weight of the cable being dragged by the vehicle increases with the length. Eventually, the distance that the pipe inspection vehicle can travel within a given pipe is limited to where the pipe inspection vehicle does not have sufficient traction to pull the weight of the length of cable. If the vehicle becomes stuck, these underground, piped environments are hard to reach without costly effort including digging out and cutting the sewer pipe.

SUMMARY

The studded wheel design disclosed herein provides increased traction of a vehicle, such as a pipe inspection vehicle, along slippery surfaces. The stud may be a crystalline material such as polycrystalline diamond (PCD). The tread pattern may incorporate both uniform and non-uniform stud shapes to provide a variety of different gripping surfaces for overcoming diverse debris and wet conditions. The wheel may be fitted for various vehicle types.

A pipe inspection vehicle equipped with a plurality of the wheels disclosed herein as been shown to have significantly increased traction within pipes. This increases the distance within the pipe that the vehicle can travel. This also reduces the likelihood of the vehicle becoming stuck in the pipe.

DETAILED DESCRIPTION

Figure 1:
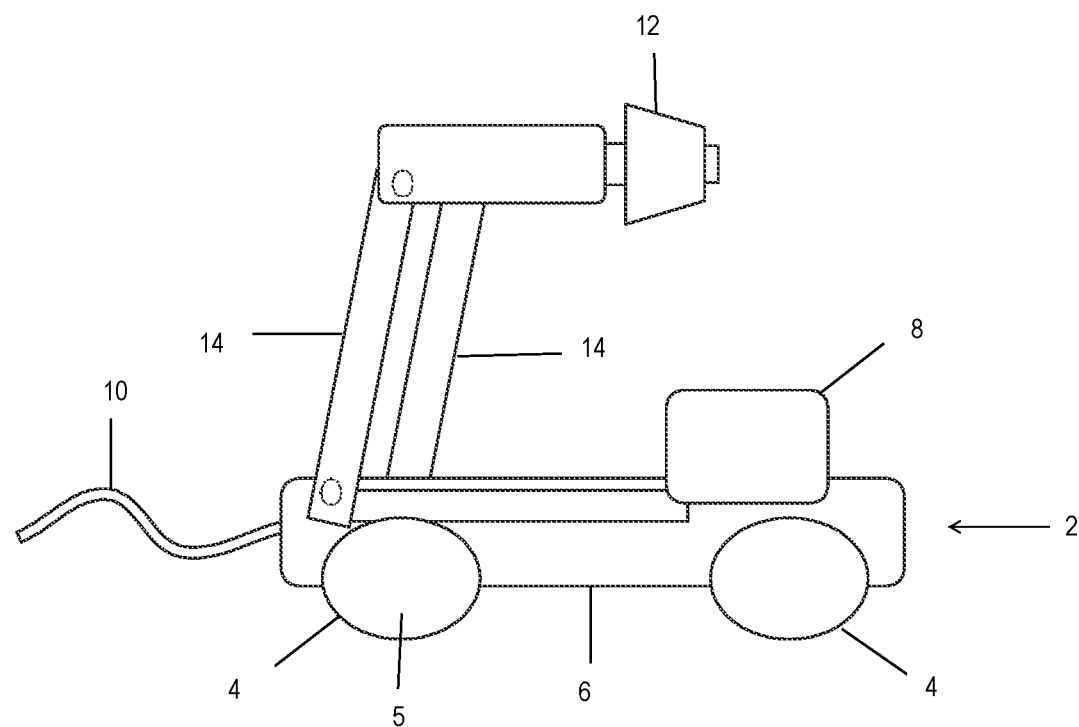
FIG. 1 shows an inspection vehicle equipped with a camera.

FIG. 1 shows a pipe inspection vehicle 2 with a plurality of wheels 4 with improved traction of the vehicle 2 on slippery surfaces. The plurality of wheels 4 each include a wheel body 5 that is manufactured from a rigid material, such as metal or metal composite. For example, the wheel body 5 may be cast of iron, aluminum, steel, or a metal composite. The wheel body 5 may be a solid single piece of material or alternatively it may be hollow with an internal chamber.

The vehicle 2 further includes a base 6 and a motor 8 secured to the base 6. The motor 8 may be an electric motor or other suitable motor. The motor 8 is configured to receive an electrical signal from a cable 10 that may provide power to the motor 8. Alternatively, the base 6 may carry a battery or other power supply and/or may instruct the motor 8 to power the vehicle forwards or backwards. The plurality of wheels 4 are secured to the vehicle base 6 and are configured to be driven by the motor 8. The motor 8 is configured to drive the plurality of wheels for vehicle forward motion or for vehicle reverse motion.

In addition to supplying the motor 8 with electrical power, the cable 10 may also transmits electronic (or optical) signals between a camera 12 of the vehicle 2 and the user. The camera 12 is supported by vertical mounts 14 and the camera 12 rests at a height above the vehicle base 6. The vertical mounts 14 are adjustable to allow for varying camera heights in order to accommodate pipes of different diameters. The camera 12 is configured to record a video and transmit the video feed in real time to the user, or store the video to onboard data storage (RAM, hard drive, SSD, memory cards, or the like) to be accessed upon physically retrieving the vehicle 2. Additionally, the camera 12 may also be configured to take pictures and transmit the pictures in real time to the user or store the pictures onboard to be accessed upon physically retrieving the vehicle 2.

Figure 2:
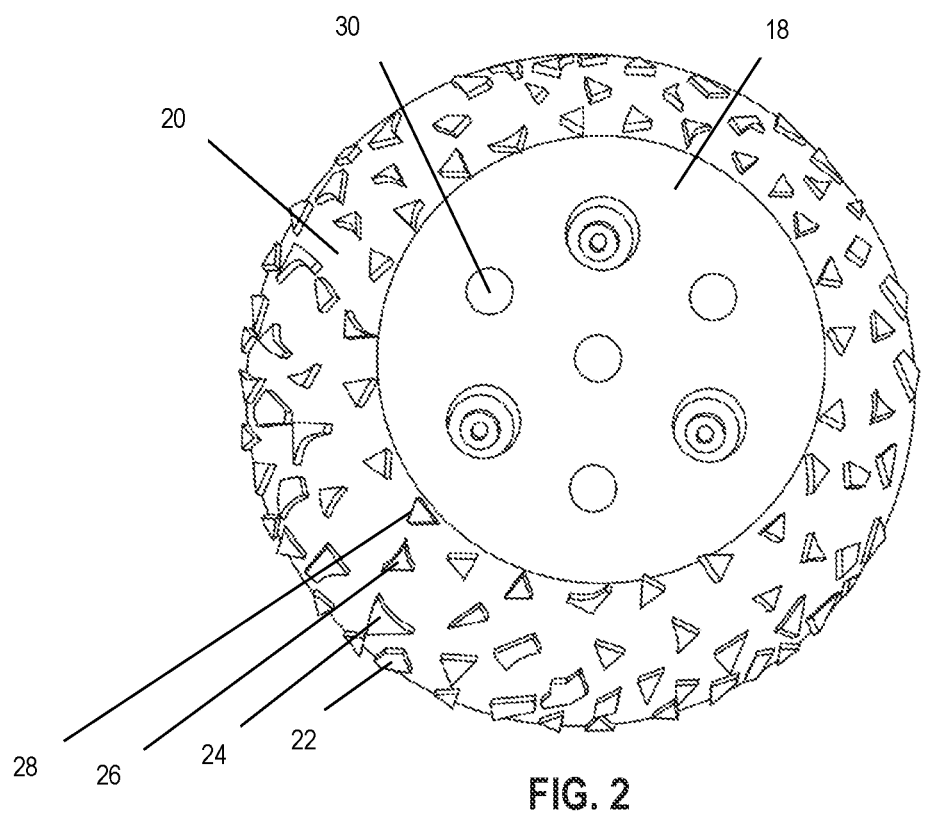
FIG. 2 shows a front perspective view of one of the wheels of FIG. 1.

FIG. 2 shows a front perspective view of one of the wheels 4 attached to the vehicle 2 in FIG. 1. The wheel 4 features an inner, first face 16 (FIG. 3) and an outer, second face 18. A convex surface 20 comprises the outer periphery of the wheel 4 and connects the first face 16 and second face 18. As is known, the convex surface 20 may be an arc of a circle that is rotated about the axis of the wheel 4. The arc of the circle may be selected to roughly match that portion of the inner surface of a sewer pipe that the wheel 4 is expected to engage.

The convex surface 20 has a plurality of studs 22, 24, 26, 28 secured directly thereto. The plurality of studs 22, 24, 26, 28 each have a thickness such that their outer surfaces are raised a distance above the convex surface 20. The plurality of studs 22, 24, 26, 28 serve as the wheel's 4 tread to increase traction on interior surfaces of pipes and the like.

The plurality of studs 22, 24, 26, 28 may be formed of a crystalline material such as polycrystalline diamond (PCD). The plurality of studs 22, 24, 26, 28 may be formed of PCD prior to being secured to the wheel body 5. The plurality of studs 22, 24, 26, 28 may be formed of only PCD that is secured directly to the wheel body 5.

The plurality of studs 22, 24, 26, 28 may be secured to the wheel body 5 by brazing, such as, for example, a brazing technique utilizing temperatures in excess of 700 degrees Celsius to be applied to a metallic solder. The metallic solder binds the crystalline material to the wheel body 5 in order to form the plurality of studs 22, 24, 26, 28. The wheel body 5 may be formed of various metals including tungsten carbide and may be cast or otherwise formed of a solid piece of metal. Other techniques for securing the plurality of studs 22, 24, 26, 28 to the wheel body 5 may be used, such as adhesive or fasteners.

The plurality of studs 22, 24, 26, 28 includes a first row of studs 22 that is aligned along an edge formed by the first face 16 and convex surface 20. The first row of studs 22 comprises individual, triangularly shaped studs that are placed substantially equidistant from one another along the entire edge. The first row of studs 22 may be of substantially equal size, shape and spacing to provide a smoother ride for the vehicle 2 (FIG. 1).

The plurality of studs 22, 24, 26, 28 further includes a second row of studs 24 and a third row of studs 26. The second row of studs 24 is positioned adjacent to the first row of studs 22 toward the second face 18. The third row of studs 26 is positioned adjacent to the second row of studs 24 so that the second row of studs 24 is located between the first row of studs 22 and third row of studs 26. Both the second row of studs 24 and third row of studs 26 may be unevenly spaced within their respective row and may be formed in different geometric shapes and sizes. The plurality of studs 22, 24, 26, 28 further includes a fourth row of studs 28 that is aligned along an edge formed by the second face 18 and convex surface 20 so that the third row of studs 26 is located between the second row of studs 24 and fourth row of studs 28.

FIG. 2 also illustrates a plurality of bearing holes 30. The plurality of bearing holes 30 extends from the first face 16 through the wheel body 5 to the second face 18. The plurality of bearing holes 30 is set to receive bearings and secure the wheel 4 to a vehicle axle.

Figure 3:
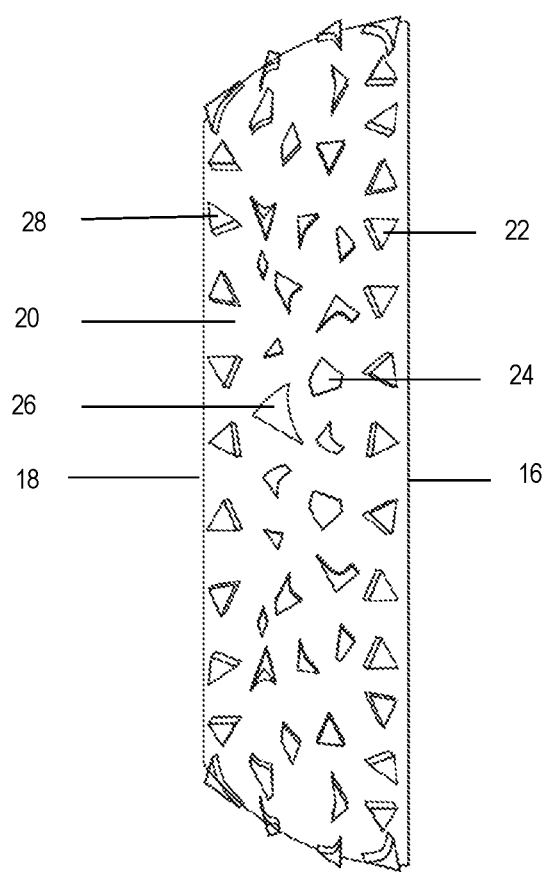
FIG. 3 shows a side view of the wheel of FIG. 2.

FIG. 3 shows a side view of the wheel 4 that is to be attached to the vehicle 2 in FIG. 1. In the example wheel 4, the first face 16 is parallel to the second face 18. The first face 16 features a larger surface area than the second face 18 and when mounted to the vehicle 2 is proximate the vehicle base 6. The convex surface 20 comprises the outer periphery of the wheel 4 and connects the first face 16 to the second face 18.

In use, the pipe inspection vehicle 2 of FIG. 1, equipped with the plurality of wheels 4 has been shown to have significantly increased traction within pipes. This increases the distance within the pipe that the vehicle 2 can travel. This also reduces the likelihood of the vehicle 2 becoming stuck in the pipe.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A wheel for supporting a vehicle, the wheel comprising:
    a first face;
    a second face opposite the first face, wherein the first face is larger than the second face;
    a convex surface at an outer periphery of the wheel, where the convex surface is positioned between the first face and the second face; and
    a plurality of studs each formed of polycrystalline diamond and wherein the polycrystalline diamond of each of the plurality of studs is secured directly to the convex surface.

2. The wheel according to claim 1, where the wheel is uniformly manufactured from a rigid material.

3. The wheel according to claim 2 wherein the rigid material is iron, aluminum, steel, or metal composite.

4. The wheel according to claim 1, wherein the wheel includes a plurality of holes through the first face and the second face for bearings to attach thereto.

5. The wheel according to claim 1 wherein the polycrystalline diamond is secured directly to the convex surface by brazing.

6. The wheel according to claim 1, where the plurality of studs includes a first row of studs on the convex surface aligned along the first face.

7. The wheel according to claim 6, where the first row of studs includes individual studs that are triangularly shaped.

8. The wheel according to claim 7, where the plurality of studs includes a second row of studs and a third row of studs, where the second row of studs aligns with and is positioned adjacent to the first row of studs, and the third row of studs aligns with and is positioned adjacent to the second row of studs, said third row of studs positioned nearer the second face than both the first and second row of studs, and both the second and third row of studs are made up of individual studs of different shapes.

9. The wheel according to claim 8, where the plurality of studs includes a fourth row of studs that aligns with and is positioned adjacent to both the third row of studs and the second face, and the fourth row of studs includes individual studs that are triangularly shaped.

10. A vehicle including a plurality of the wheels of claim 1, the vehicle comprising:
    a base;
    the plurality of wheels rotatably secured to the base;
    a motor carried by the base and configured to drive at least one of the plurality of wheels; and
    a camera carried by the base.

11. The vehicle according to claim 10, where the vehicle is movable along a ground surface that is curved such as a sewer pipe.

12. The vehicle of claim 10 further including a cable secured to the base, where the cable provides electricity to power the motor and camera, and the cable also transmits video signals to the camera and receives video signals from the camera.

13. The wheel of claim 1 wherein the plurality of studs are configured to serve as tread of the wheel.

14. The wheel of claim 13 wherein the plurality of studs are formed of only polycrystalline diamond.

15. The wheel of claim 14 wherein the convex surface of the wheel between the plurality of studs is exposed.

16. A wheel for supporting a vehicle, the wheel comprising:
    a wheel body including a first face, a second face opposite the first face, and a convex outer peripheral surface positioned between the first face and the second face; and
    a plurality of studs formed only of polycrystalline diamond and configured to serve as tread of the wheel, wherein the polycrystalline diamond is secured directly to the outer peripheral surface, wherein the outer peripheral surface of the wheel between the plurality of studs is exposed.

17. The wheel of claim 16 wherein the outer peripheral surface is rigid.

18. The wheel of claim 17 wherein the wheel body is solid and formed of a rigid material.

19. A method for producing a wheel with studs secured thereto to increase traction with a surface comprising:
    a) providing a wheel body having a first face, an opposite second face, and a convex tread surface connecting a peripheral edge of the first face to a peripheral edge of the second face; and
    b) after step a), securing a plurality of polycrystalline diamond studs directly to the tread surface.

20. The method of claim 19 wherein the wheel body including the tread surface is rigid.

21. The method of claim 19 wherein the step of securing the studs to the wheel includes brazing.

* * * * *